(12) United States Patent
Lin et al.

(10) Patent No.: US 7,454,089 B2
(45) Date of Patent: Nov. 18, 2008

(54) INTERPOLATION SYSTEM AND METHOD

(75) Inventors: Che-Sheng Lin, Taipei (TW); Ching-Lung Mao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 844 days.

(21) Appl. No.: 10/867,130

(22) Filed: Jun. 14, 2004

(65) Prior Publication Data

US 2005/0276516 A1    Dec. 15, 2005

(51) Int. Cl.
G06K 9/32 (2006.01)
H04N 11/20 (2006.01)
H04N 7/01 (2006.01)
H04N 1/46 (2006.01)
G06F 7/00 (2006.01)
G06F 15/00 (2006.01)

(52) U.S. Cl. ............... 382/300; 382/298; 382/299; 348/445; 358/525; 708/209

(58) Field of Classification Search ............... 382/300, 382/298, 299; 348/445; 358/525, FOR. 166; 708/209
See application file for complete search history.

(56) References Cited

U.S. PATENT DOCUMENTS

2005/0058371 A1*  3/2005  Huang et al. ............... 382/300
2006/0045384 A1*  3/2006  De Haan ..................... 382/299

* cited by examiner

Primary Examiner—Matthew C. Bella
Assistant Examiner—Randolph Chu
(74) Attorney, Agent, or Firm—Apex Juris, pllc; Tracy M Heims

(57) ABSTRACT

An interpolation system and method is applicable to image process of data size change. The characteristics of the interpolation system are that some simple operations in the system and method are operated by hardware (operator), while some complicated operations are processed by software. Though the demarcation, the hardware for performing interpolation is prevented from complicated composition so as to reduce the cost and the time needed.

12 Claims, 8 Drawing Sheets

INTERPOLATION SYSTEM AND METHOD

BACKGROUND OF THE INVENTION

1. Field of the Invention

The invention generally relates to an interpolation system and method, and in particular relates to an interpolation system and method applicable to image process of data size change.

2. Related Art

As technologies being advanced, digital cameras are replacing conventional cameras as a major tool of photography. After taking pictures, the image data can be transferred from the camera to a computer or the like, and outputted through a printer or a multi-function printer. The size of image output can be modified (enlarged or reduced) according to user's needs. In comparison to conventional image development, the modern digital process through image processing and printing is much more convenient for users.

Taking a screen image for example. The image on the screen is composed of matrix of pixels. Each pixel has at least a grayscale value to represent its color parameters. When enlarging an image, the distances between pixels are multiplied with an enlargement ratio so as to locate the new pixels. As shown in FIG. 1, the original image in the left of 2 plus 2 pixels is enlarged into an image of 4 plus 4 pixels by an enlargement ratio of 2. However, the simple enlargement of pixel distance generates some gaps in the matrix. Only the pixels in the correspondent positions carry the grayscale values. Therefore, the enlarged image loses fidelity.

Therefore, someone applies interpolation to determine the grayscale values of pixels in different positions after enlargement. For example, as shown in FIG. 2, supposed the grayscale values of four pixels A, B, C and D are P1, P2, P3 and P4. Then, the grayscale value of a pixel P among the four pixels can be determined through linear interpolation by the following equation:

$$P = dxdyP_1 + (1-dx)dyP_2 + dx(1-dy)P_3 + (1-dx)(1-dy)P_4$$
$$= [\,dxdy \quad (1-dx)dy \quad dx(1-dy) \quad (1-dx)(1-dy)\,][\,P_1 \quad P_2 \quad P_3 \quad P_4\,]^T$$
$$= M\,[\,P_1 \quad P_2 \quad P_3 \quad P_4\,]^T$$

From the above equation, we can see that the grayscale value of pixel P is most influenced by the grayscale value of the nearest pixel. Other interpolation methods can be applied to determine the greyscale values of pixels P.

Conventionally the interpolation process to determine greyscale values of pixels are made by hardware of multipliers and adders. The hardware is more expensive. Further, the processing time of the hardware is longer when executing a more complicated interpolation.

For a specific interpolation process, the logic operation algorithm is made into an application specific integrated circuit (ASIC). To process a different interpolation process, a new ASIC with that operation algorithm is then required. It is costly and inconvenient to users.

SUMMARY OF THE INVENTION

The object of the invention is to provide an interpolation system and method applicable to image process of data size change.

As shown in FIG. 2, the interpolation system and method of the invention is applicable to determine the grayscale value p of intermediate destination pixel P after changing the size of an image. The destination pixel P is among four original pixels A, B, C and D. The grayscale value p can be determined by grayscale values of the four original pixels. Different interpolation algorithms can be applied to the system and method of the invention simply by adopting different transformation matrixes corresponding to the algorithms.

Taking the linear interpolation for example. Four original pixels A, B, C and D have grayscale values P1, P1, P3 and P4. The grayscale value p of a destination pixel P is calculated by inner product of the grayscale values P1, P1, P3 and P4 through an interpolation transformation matrix M based on the following equation:

$$P = dxdyP_1 + (1-dx)dyP_2 + dx(1-dy)P_3 + (1-dx)(1-dy)P_4$$
$$= [\,dxdy \quad (1-dx)dy \quad dx(1-dy) \quad (1-dx)(1-dy)\,][\,P_1 \quad P_2 \quad P_3 \quad P_4\,]^T$$
$$= M\,[\,P_1 \quad P_2 \quad P_3 \quad P_4\,]^T$$

As shown in FIG. 3, the rectangle composed of the original pixels A, B, C and D is divided into 16 sections A11~A44 having central reference pixels R1~R16. Four elements $m_1$, $m_2$, $m_3$, $m_4$ of a transformation matrix M corresponding to the reference pixels R1~R16 are calculated by the following equation:

$$M = [\,dxdy \quad (1-dx)dy \quad dx(1-dy) \quad (1-dx)(1-dy)\,]$$
$$= [\,m_1 \quad m_2 \quad m_3 \quad m_4\,]$$

Because each reference pixel R1~R16 has difference distances to the original pixels A, B, C and D, the reference pixels R1~R16 are correspondent to different transformation matrixes M. Therefore, judging the location of the destination pixel P in the 16 sections A11~A44 and using the correspondent transformation matrix M to calculate of the grayscale value of the pixel P.

The characteristics of the invention are that some simple operations in the system and method are operated by hardware, while some complicated operations are processed by software. Though the demarcation, the hardware for performing interpolation of the invention is prevented from complicated composition so as to reduce the cost and the time needed. Further, when a different interpolation algorithm is required, a different interpolation transformation matrix is chosen for the software operation without the need of using new a new ASIC. The operation is therefore flexible and convenient.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

Figure 4:
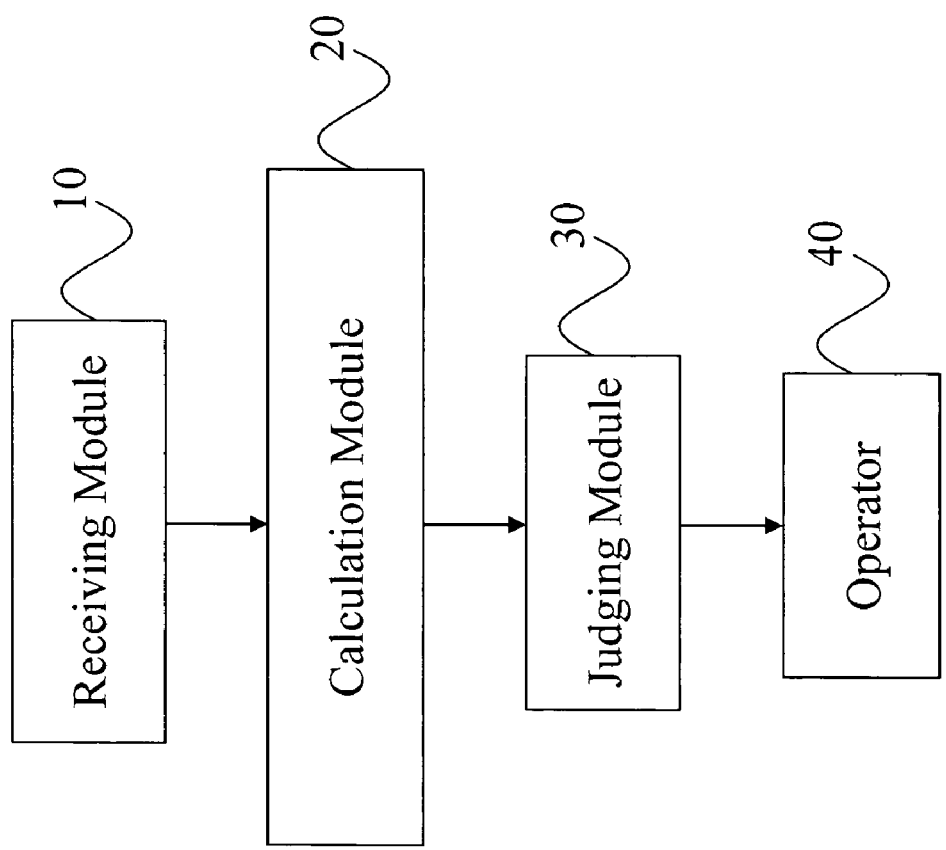
FIG. 4 is a systematic composition diagram of the invention.
Figure 5:
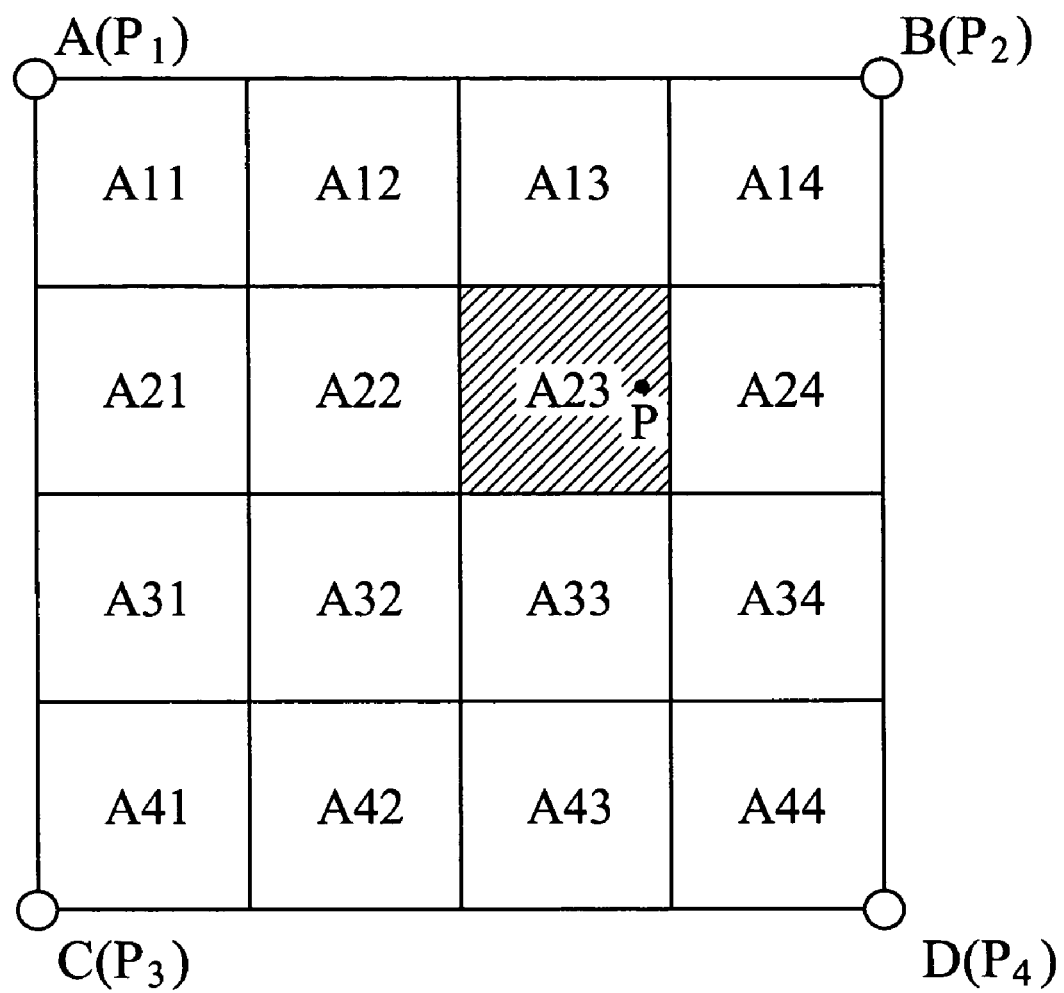
FIG. 5 is an explanatory view of a destination pixel P located in an operational section A23.

FIG. 4 is a systematic composition diagram of the invention. The system is applicable to a grayscale-transformed image data for calculating the grayscale value p of a destination pixel P surrounded by four original pixels A, B, C and D. The four original pixels A, B, C and D form a rectangle including the destination pixel P. The composition of the interpolation system of the invention includes a receiving module 10, a calculation module 20 for the transformation matrix of central pixels, a judging module 30 and an operator 40.

Figure 1:
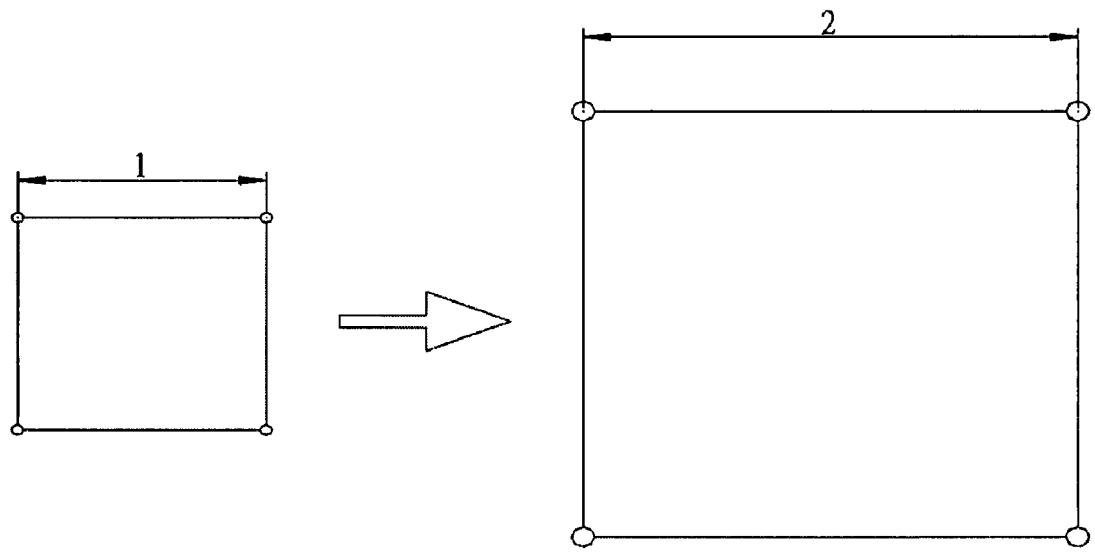
FIG. 1 is an illustration of an image enlargement of prior arts.
Figure 2:
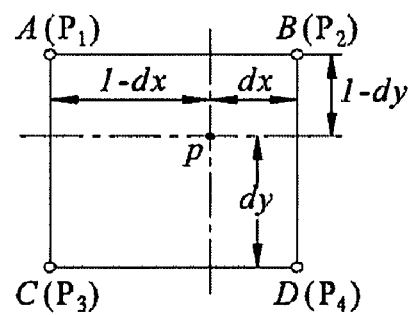
FIG. 2 is an illustration of interpolation process.
Figure 3:
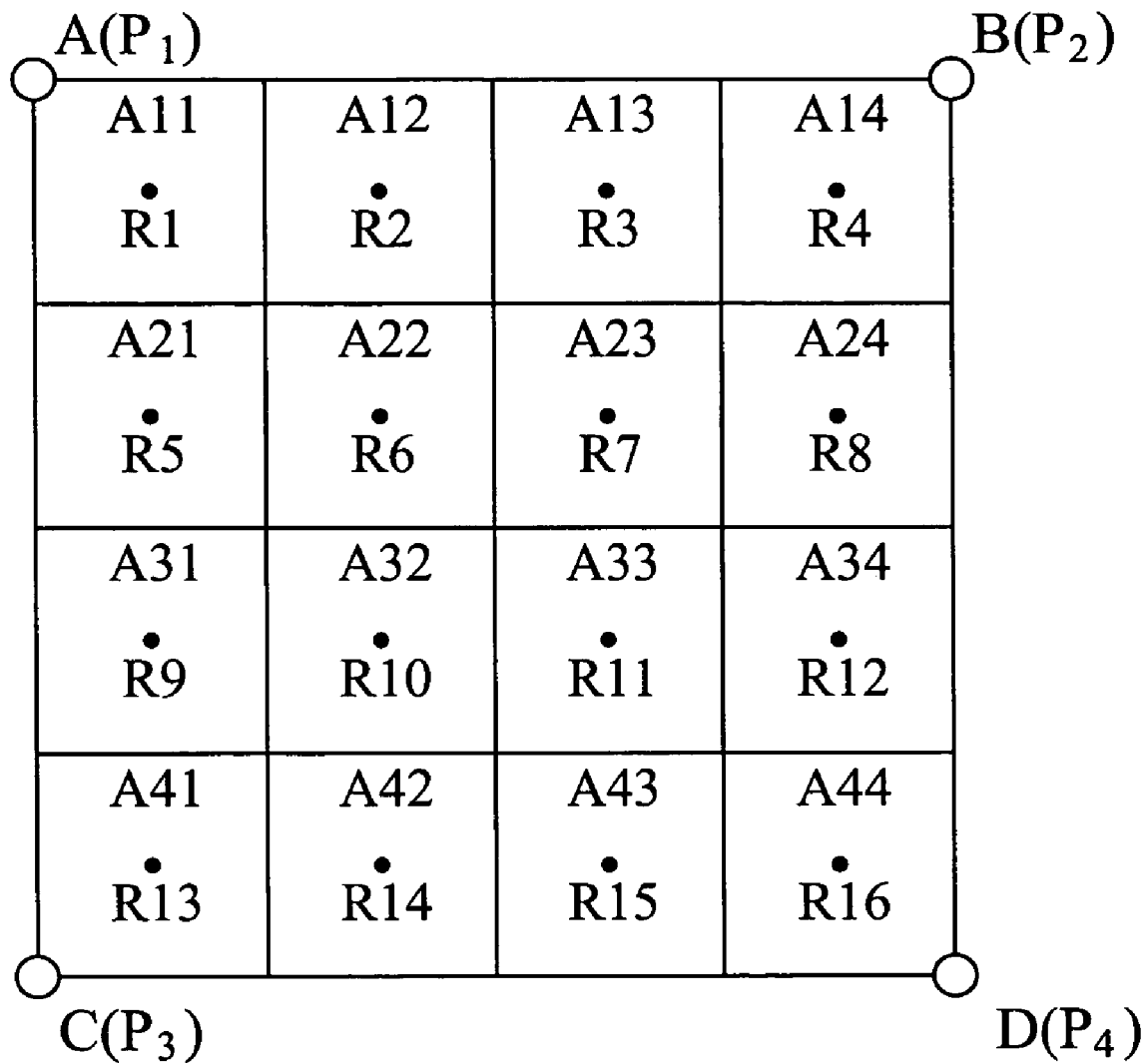
FIG. 3 is an illustration of dividing a rectangle of four original pixels A, B, C and D into 16 sections A11~A44.

As shown in FIG. 3, the rectangle composed of the four original pixels A, B, C and D is divided into 16 sections A11~A44. The sections A11~A44 include central reference pixels R1~R16.

The receiving module 10 receives grayscale values P1, P2, P3 and P4 of the four original pixels A, B, C and D; and an interpolation transformation matrix M. The interpolation transformation matrix M is presented by:

$$M = [\, dxdy \quad (1-dx)dy \quad dx(1-dy) \quad (1-dx)(1-dy) \,]$$
$$= [\, m_1 \quad m_2 \quad m_3 \quad m_4 \,]$$

The above interpolation transformation matrix M is of linear interpolation. When the user applies a different interpolation algorithm, a different transformation matrix M is then used.

The elements $m_1, m_2, m_3, m_4$ of the interpolation transformation matrix M are calculated by the relative distances dx, dy from coordinates of the destination pixel P and the original pixels A, B, C, D. Therefore, the calculation module 20 applies the interpolation transformation matrix M and the relative coordinates of the central reference pixel R to the four original pixels A, B, C, D to get the distances dx, dy and calculate the four elements $m_1, m_2, m_3, m_4$ of the transformation matrix M for each central reference pixel R1~R16.

The calculations are complicated. Therefore, they are processed by software. This can save the time of hardware operation.

Then, the judging module 30 determines the position of the destination pixel P and identifies the operational section it belongs to. For example, the destination pixel P is located in the section A23, which is the operational section for further operations. The central reference pixel R7 of the section A23 is used to apply the operation of four elements of the interpolation transformation matrix M. Any destination pixel P located in a same section gets a same grayscale value.

Finally, the operator 40 applies the four elements of the interpolation transformation matrix M corresponding to the central reference pixel R7 of the section A23, operates with the four grayscale values P1, P2, P3 and P4 of the original pixels A, B, C, D, and gets the grayscale value p of the destination pixel P.

In the aforesaid inner product operation, the elements of the two matrixes are first multiplied($m_1 \times P_1, m_2 \times P_2, m_3 \times P_3, m_4 \times P_4$) then added ($m_1 \times P_1 + m_2 \times P_2 + m_3 \times P_3 + m_4 \times P_4$). Therefore, the operator 40 requires a multiplier and an adder. Also, as the multiplication and addition are simple, they reduce the hardware load and save the time of image process.

Figure 6:
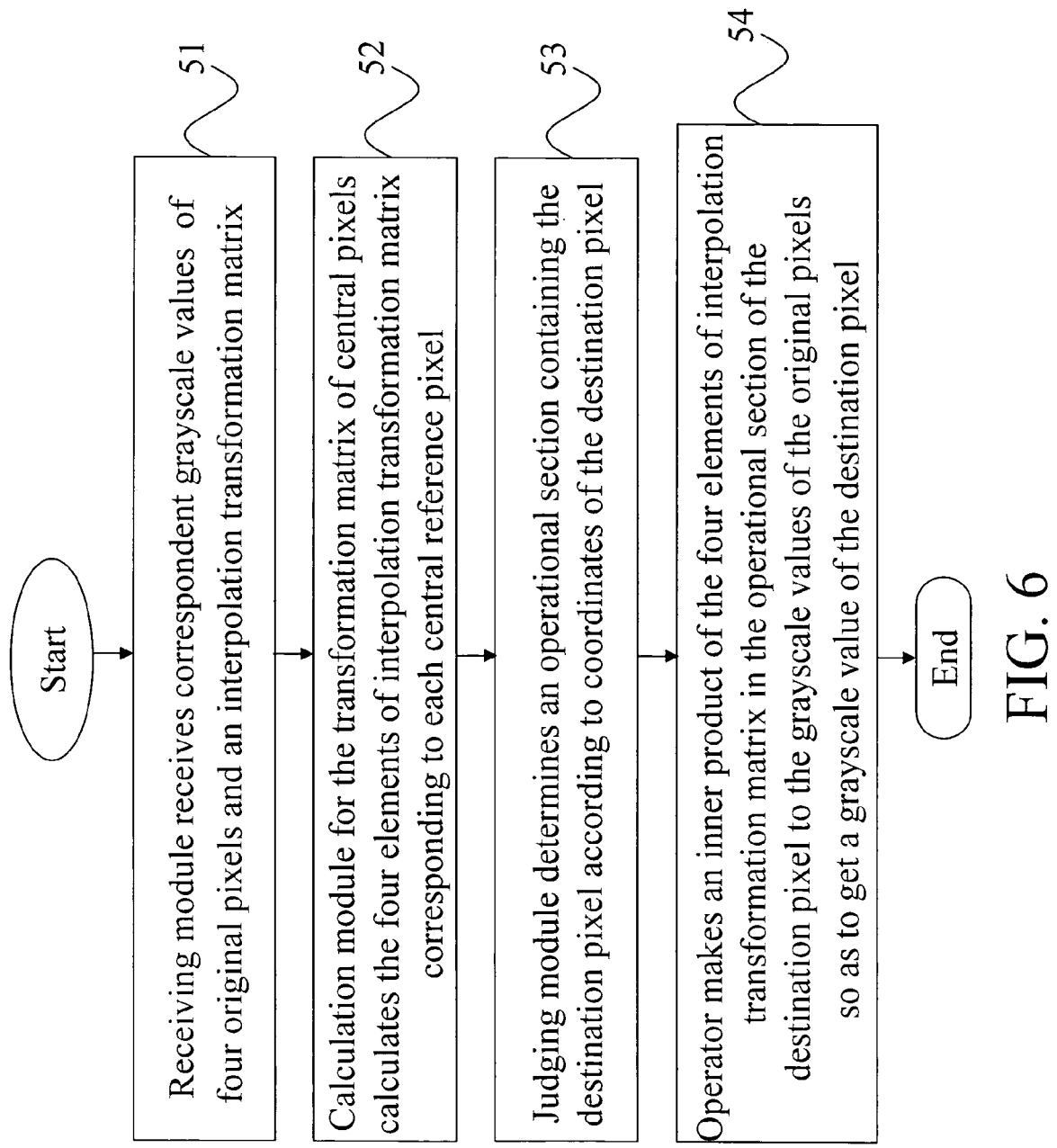
FIG. 6 is a flowchart of an interpolation method of the invention.

FIG. 6 is a flowchart of an interpolation method of the invention. The components described in the flowchart can be referred to FIG. 4.

First, the receiving module receives the correspondent grayscale values of four original pixels and an interpolation transformation matrix (step 51). The interpolation transformation matrix M is designated by user. Therefore, when the user chooses a different transformation matrix for calculating the grayscale value p of the destination pixel P, the specific interpolation transformation matrix M is loaded.

Then, the calculation module for the transformation matrix of central pixels calculates the four elements of interpolation transformation matrix corresponding to each central reference pixel (step 52) according to the interpolation transformation matrix and the relative coordinates of the central reference pixels and the original pixels.

Because the interpolation transformation matrix M corresponding to each central reference pixel is relative to the distances dx, dy, the calculation of four elements $m_1, m_2, m_3, m_4$ of the transformation matrix M requires relative coordinates of the destination pixel P to the original pixels A, B, C, D. The calculation of the elements $m_1, m_2, m_3, m_4$ is more complicated. Therefore, this step is made by software.

Then, the judging module determines an operational section containing the destination pixel P according to coordinates of the destination pixel (step 53). Any destination pixel P located in a same operational section can apply a same interpolation transformation matrix M.

Finally, the operator makes an inner product of the four elements of interpolation transformation matrix in the operational section of the destination pixel to the grayscale values of the original pixels so as to get grayscale value of the destination pixel (step 54). This step uses simple multiplication and addition operations. Therefore, the operator 30 includes a multiplier and an adder for the inner product operation for getting the grayscale value p of the destination pixel P.

Figure 7:
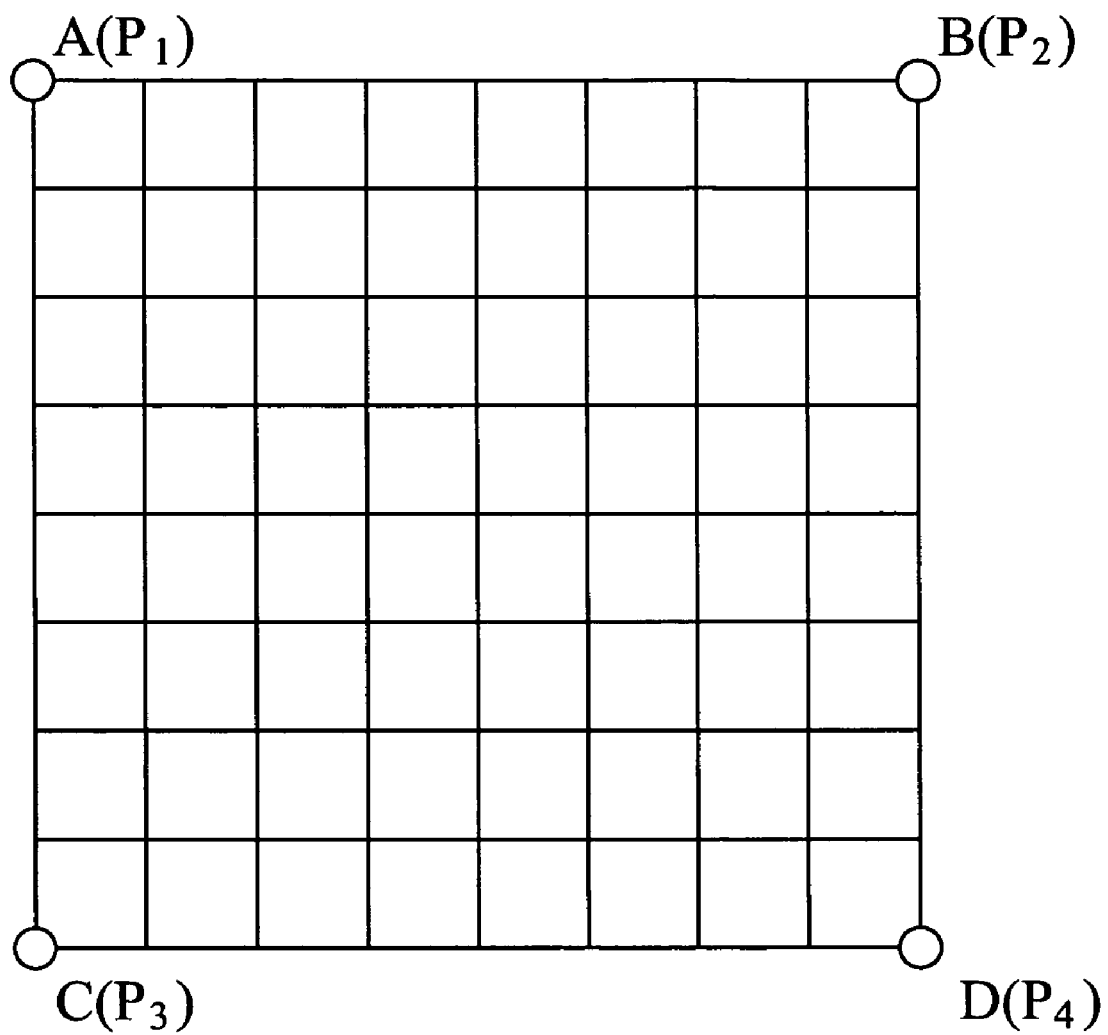
FIG. 7 is an illustration of dividing a rectangle of four original pixels A, B, C, D into 64 sections for calculating the grayscale value p of a destination pixel P.
Figure 8:
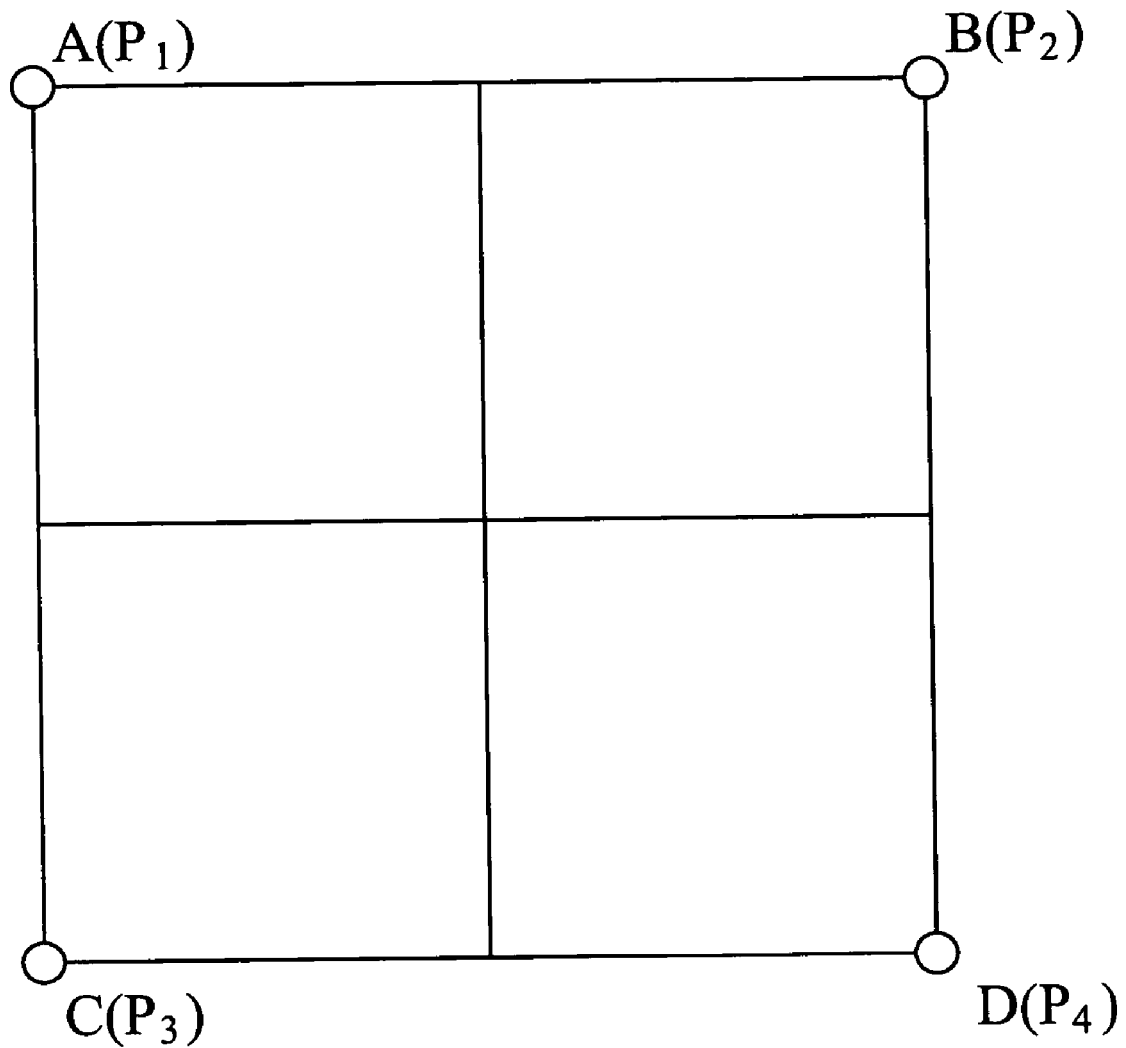
FIG. 8 is an illustration of dividing a rectangle of four original pixels A, B, C, D into four sections for calculating the grayscale value p of a destination pixel P.

The number of sections in the original pixels square depends on precision requirement. For example, as shown in FIG. 7, the square composed of the original pixels A, B, C and D is divided into 64 sections for calculating the grayscale value p of a destination pixel P. The more sections provide a more precise grayscale value p. However, it costs more time of process. On the contrary, as shown in FIG. 8, the square composed of the original pixels A, B, C and D is divided into four sections for calculating the grayscale value p of a destination pixel P. The less sections provide a less precise grayscale value p. However, it saves time of process. Therefore, the section number is determined according to user's requirement of precision.

Figure 9:
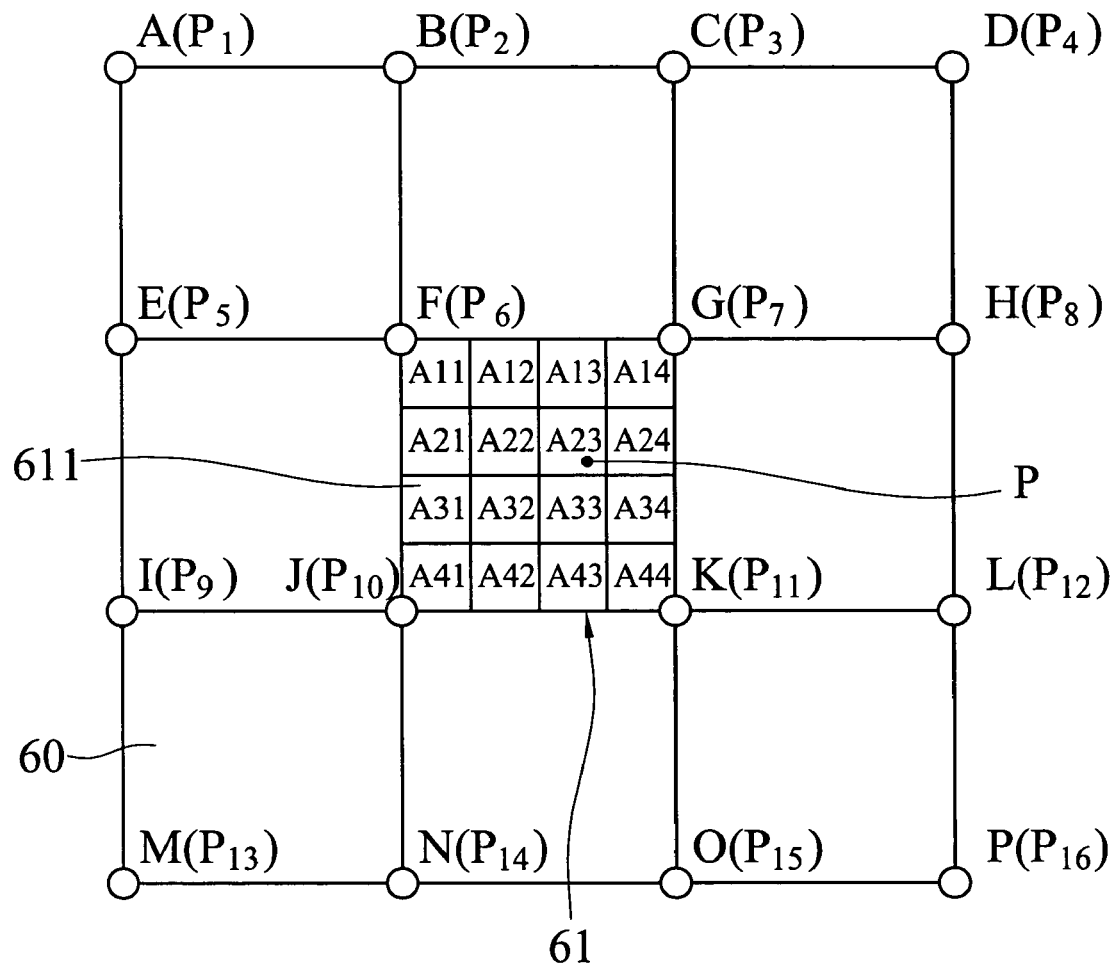
FIG. 9 is an illustration of a cubic interpolation process applied to 16 original pixels surrounding a destination pixel P for calculating the grayscale value p of the destination pixel P.

FIG. 9 is an illustration of a cubic interpolation process applied to 16 original pixels A to P surrounding a destination pixel P for calculating the grayscale value p of the destination pixel P. The sixteen original pixels A to P are located in a 4*4 matrix and formed with nine sections 60. Each original pixel A to P has a correspondent grayscale value $P_1$~$P_{16}$ respectively. The destination pixel P is located in a central section 61. The central section 61 is further divided into a plurality of sub-sections 611 each having a central reference pixel (not shown in the drawing).

The greyscale value p of the destination pixel P is calculated by inner product of an interpolation transformation matrix $M_{nm}$ and grayscale values $P_1 \sim P_{16}$ of original pixels A to P according to a cubic interpolation process applying the following equation:

$$A_{nm} = M_{nm} \begin{bmatrix} P1 \\ P2 \\ M \\ P15 \\ P16 \end{bmatrix}, \quad n = 1 \sim 4, \ m = 1 \sim 4$$

$$M11 = [ma_{11} \ mb_{11} \ mc_{11} \ md_{11} K \ mq_{11}]_{1 \times 16}$$
$$M12 = [ma_{12} \ mb_{12} \ mc_{12} \ md_{12} K \ mq_{12}]_{1 \times 16}$$
$$M$$
$$M44 = [ma_{44} \ mb_{44} \ mc_{44} \ md_{44} K \ mq_{44}]_{1 \times 16}$$

In which $ma_{11}, mb_{11}, mc_{11} \ldots mq_{11}$ represents sixteen elements of a matrix M11; $ma_{12}, mb_{12}, mc_{12} \ldots mq_{12}$ represents sixteen elements of a matrix M12, and so on.

The calculation of greyscale value p of the destination pixel P is similar to aforesaid linear interpolation but the number of original pixels A to P is increased. Therefore, a cubic interpolation is applied. The more original pixels provide a more precise grayscale value p. However, it cost more time of process. Therefore, the pixel number is determined according to user's requirement of precision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An interpolation system applicable to a grayscale-transformed image data for calculating a grayscale value of a destination pixel where said interpolation system comprises:
   four original pixels that form the corners of a rectangle and where each original pixel has a correspondent grayscale value;
   said rectangle is further divided into a plurality of sections where each section has a central reference pixel;
   a receiving module, for receiving said correspondent grayscale values of said four original pixels and an interpolation transformation matrix;
   a calculation module, for calculating correspondent four elements of said interpolation transformation matrix of said central reference pixels according to said interpolation transformation matrix and relative coordinates of said central reference pixels to said original pixels;
   a judging module, for determining an operational section of said destination pixel according to coordinates of said destination pixel; and
   an operator, for making an inner product of said four elements of interpolation transformation matrix in said operational section of said destination pixel to grayscale values of said original pixels, and getting a grayscale value of said destination pixel.

2. The interpolation system according to claim 1 wherein a different interpolation transformation matrix is applied for making a different interpolation.

3. The interpolation system according to claim 1 wherein said operator comprises a multiplier and an adder.

4. An interpolation method applicable to a grayscale-transformed image data for calculating a grayscale value of a destination pixel comprising the steps of:
   surrounding said destination pixel by four original pixels with each having correspondent grayscale values;
   forming a rectangle with said four original pixels;
   dividing said rectangle into a plurality of sections with each section having a central reference pixel;
   receiving correspondent grayscale values of said four original pixels and an interpolation transformation matrix;
   calculating correspondent four elements of said interpolation transformation matrix of said central reference pixels according to said interpolation transformation matrix and relative coordinates of said central reference pixels to said original pixels;
   determining an operational section of said destination pixel according to coordinates of said destination pixel; and
   making an inner product of said four elements of interpolation transformation matrix in said operational section of said destination pixel to grayscale values of said original pixels, and getting a grayscale value of said destination pixel.

5. The interpolation method according to claim 4 wherein said step of making an inner product and getting a grayscale value of said destination pixel is made by an operator for an inner product of said four elements of interpolation transformation matrix to grayscale values of said original pixels.

6. The interpolation method according to claim 5 wherein said operator comprises a multiplier and an adder.

7. An interpolation system applicable to a grayscale-transformed image data for calculating a grayscale value of a destination pixel where said interpolation system comprises:
   sixteen original pixels where each original pixel has a correspondent grayscale value;
   said sixteen original pixels form a 4*4 matrix and nine sections;
   said destination pixel is located in a section that is divided into a plurality of sub-sections where each section has a central reference;
   a receiving module, for receiving said correspondent grayscale values of said sixteen original pixels and an interpolation transformation matrix;
   a calculation module, for calculating correspondent sixteen elements of said interpolation transformation matrix of said central reference pixels according to said interpolation transformation matrix and relative coordinates of said central reference pixels to said original pixels;
   a judging module, for determining an operational section of said destination pixel according to coordinates of said destination pixel; and
   an operator, for making an inner product of said sixteen elements of interpolation transformation matrix in said section of said destination pixel to grayscale values of said original pixels, and getting a grayscale value of said destination pixel.

8. The interpolation system according to claim 7 wherein a different interpolation transformation matrix is applied for making a different interpolation.

9. The interpolation system according to claim 7 wherein said operator comprises a multiplier and an adder.

10. An interpolation method applicable to a grayscale-transformed image data for calculating a grayscale value of a destination pixel comprising the steps of:

surrounding said destination pixel by sixteen original pixels with each having correspondent grayscale values;

forming a 4*4 matrix and nine sections with said sixteen original pixels;

dividing said 4*4 matrix and nine sections into a plurality of sub-sections with each section having a central reference pixel;

receiving correspondent grayscale values of said sixteen original pixels and an interpolation transformation matrix;

calculating correspondent sixteen elements of said interpolation transformation matrix of said central reference pixels according to said interpolation transformation matrix and relative coordinates of said central reference pixels to said original pixels;

determining an operational section of said destination pixel according to coordinates of said destination pixel; and making an inner product of said sixteen elements of interpolation transformation matrix in said section of said destination pixel to grayscale values of said original pixels, and getting a grayscale value of said destination pixel.

11. The interpolation method according to claim 10 wherein said step of making an inner product and getting a grayscale value of said destination pixel is made by an operator for an inner product of said sixteen elements of interpolation transformation matrix to grayscale values of said original pixels.

12. The interpolation method according to claim 11 wherein said operator comprises a multiplier and an adder.

* * * * *